(12) United States Patent
Eguchi

(10) Patent No.: US 6,336,888 B1
(45) Date of Patent: Jan. 8, 2002

(54) VEHICULAR TRANSMISSION STOP CONTROL SYSTEM

(75) Inventor: Takahiro Eguchi, Tokyo (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/616,367

(22) Filed: Jul. 13, 2000

(30) Foreign Application Priority Data

Jul. 16, 1999 (JP) .......................................... 11-203466

(51) Int. Cl.$^7$ ................................................ B60K 1/02
(52) U.S. Cl. .......................................................... 477/3
(58) Field of Search .............................. 477/3, 98, 107

(56) References Cited

U.S. PATENT DOCUMENTS 6,251,042 B1 * 6/2001 Peterson et al. ................ 477/3

* cited by examiner

*Primary Examiner*—Dirk Wright
(74) *Attorney, Agent, or Firm*—Armstrong, Westerman, Hattori, McLeland & Naughton, LLP

(57) ABSTRACT

A vehicular transmission comprises an engine E, a continuously variable transmission CVT and a starting clutch 5. The driving force from the engine E is conveyed through the continuously variable transmission CVT with a speed change to a countershaft 2, and the starting clutch 5 is used to convey this driving force from the countershaft 2 to wheels of a vehicle. The continuously variable transmission CVT is hydraulically controlled by a control valve CV which receives control signals through a line 35 from an electrical control unit ECU. When the temperature of the oil used for engaging and disengaging the starting clutch 5 is equal to or higher than a predetermined temperature, the transmission allows the engine E to stop operating. This control to terminate the operation of the engine is an idling elimination control and is achieved by terminating the fuel supply to the engine and by maintaining the resulting condition of non-fuel supply while the vehicle is being decelerated and brought into a halt.

7 Claims, 7 Drawing Sheets

Fig. 6
(a)
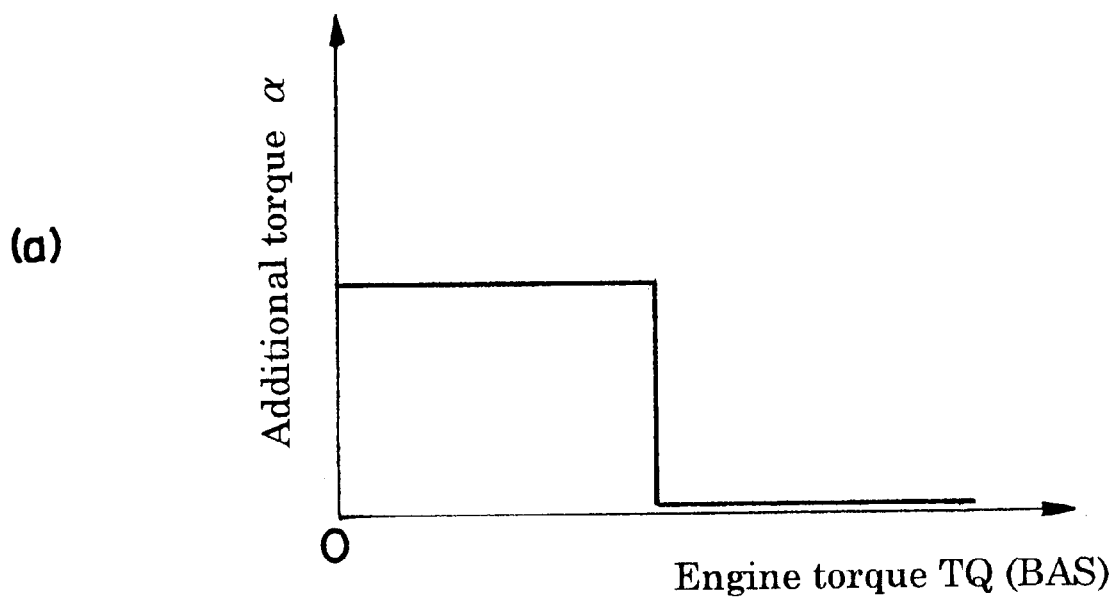
(b)
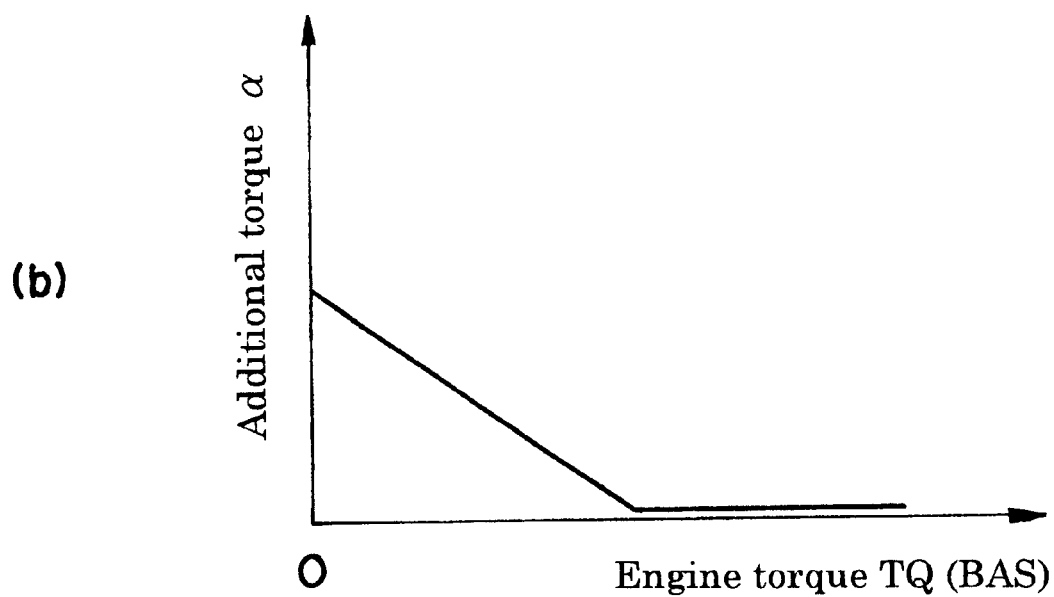

VEHICULAR TRANSMISSION STOP CONTROL SYSTEM

FIELD OF THE INVENTION

The present invention relates generally to a mechanical power transmission for driving a vehicle, which transmission conveys the driving force output from the engine to the drive wheels of the vehicle with a speed change being performed by a speed change mechanism.

BACKGROUND OF THE INVENTION

Many such transmissions have been used for driving vehicles, and a variety of speed change mechanisms are incorporated in the transmissions, ranging from gear transmissions with a plurality of steps of speed change ratios to continuously variable transmissions with gradually varying speed change ratio controlled by means of a belt, etc. Recently, a hybrid transmission which uses an electrical motor in addition to an engine has been introduced for fuel efficiency. The applicant of the present invention is also developing a hybrid transmission. This hybrid transmission comprises a continuously variable transmission with a metal V-belt which is disposed around the common output shaft of the engine and the electrical motor arranged in series, and the output shaft of the continuously variable transmission is provided with a starting clutch (main clutch).

One purpose for developing this transmission is to improve fuel efficiency. Therefore, desirably, the operation of the engine be controlled such that the engine stops its operation when the vehicle come into a halt (such control is here referred to as "idling elimination control"). As an idling elimination control, there is a method to stop the engine when the engine comes into an idling condition after the vehicle has stopped completely. However, while the vehicle is decelerating after the accelerator pedal once depressed has been released, an engine brake is effected. It is known that, during this deceleration, the fuel injection to the engine is terminated (or the supply of fuel is terminated). In consideration of this fuel supply termination, there is a more desirable way to eliminate engine idling. When the vehicle is decelerated to a halt, the fuel injection is terminated, and this condition of non-fuel supply should be maintained to stop the operation of the engine (engine strop control).

In general, the oil pump which generates the hydraulic pressure to control the transmission is connected to the output shaft of the engine (i.e., the input shaft of the speed change mechanism) and is driven by the engine when the engine rotates. Also in the above mentioned hybrid transmission, which comprises an engine and an electrical motor disposed in series, the oil pump is connected to the common shaft (i.e., the input shaft of the speed change mechanism) of the engine and the electrical motor, and it is driven by the engine or the motor as either rotates. Therefore, when the vehicle comes into a halt, if the engine stops, the hydraulic pressure decreases to zero. When the engine or the electrical motor (these elements are hereinafter referred to as "engine, etc.") is restarted to start the vehicle again, the pressure is regenerated.

Here, if the temperature of the oil, which is the medium used for controlling the engagement and disengagement of the starting clutch (main clutch), is sufficiently high, then the pressure, which has once decreased, quickly returns to a normal level enabling the system to control every part as necessary when the engine, etc. are restarted. However, if the temperature is low, then there is a tendency that the pressure of the hydraulic circuit is not easily released after the engine is stopped or not easily returned to a sufficient level after the engine is restarted because of a high viscosity of the oil (i.e., the viscous resistance is great).

From this reason, the following problem is likely to occur. When the temperature of the oil is low, the operation of the starting clutch cannot follow each command signal received in the engagement control of the starting clutch and lags to engage the clutch discs (i.e., a starting up lag). Generally, the starting clutch is controlled such that the clutch discs are quickly brought close to each other to clear the part of the stroke which does not contribute to the actual engagement of the clutch for the purpose of saving time in the control of the starting clutch (this is referred to as "invalid stroke clearing control"). If the temperature of the oil is low, the pressure necessary for performing the invalid stroke clearing control does not become available immediately. As a result, as the pressure for the engagement control increases, the engagement of the clutch may progress rapidly or suddenly in a runaway fashion and may generate a shock.

SUMMARY OF THE INVENTION

It is an object of the present invention to provide a stop control system for a vehicular transmission which system alleviates the above mentioned starting up lag and shock and shortens the time during which such phenomena may take place.

In order to achieve this objective, the present invention provides a stop control system for a mechanical power transmission used for driving a vehicle. Here, the power transmission comprises a speed change mechanism (for example, the continuously variable transmission CVT of the embodiment described in the following section), which conveys a driving force from an engine through frictionally engaging means (for example, the starting clutch 5 of the following embodiment). In this transmission, the stop control system controls the termination of the operation of the engine when the vehicle is brought into a halt. The control system allows the termination of the operation of the engine only when the temperature of the hydraulic oil used for generating the hydraulic pressure that controls the engagement and disengagement of the frictionally engaging means is equal to or higher than a predetermined temperature.

The stop control system according to the present invention allows the engine to cease its operation when the temperature of the oil used for the engagement and disengagement of the frictionally engaging means is equal to or higher than a predetermined temperature (i.e., a temperature which endows the oil a viscosity suitable for the actuation control of the starting clutch, for example, 20 degrees Celsius). When the oil temperature is low, the engine is not allowed to stop its operation even though the vehicle is brought into a halt. In this way, the hydraulic pressure supplied from an oil pump to the hydraulic circuit which controls each hydraulic actuator of the transmission is kept at a pressure high enough for the operation of the transmission, so a prevention is made against the above mentioned problems of start up lag and start up shock. Even if the oil temperature becomes lower while the vehicle is not driving, because the engine is kept in operation by this control system, the time during which a start up lag and a start up shock may occur is shortened effectively, so the hydraulic pressure returns to a suitable level quickly.

It is preferable that the pressure of the oil used for actuating the transmission be raised when the oil temperature is lower than the predetermined temperature. To raise the hydraulic pressure, for example, the hydraulic pressure generating the lateral thrust applied to the drive and driven pulleys for varying the speed change ratio of the metal V-belt continuously variable transmission can be increased, the hydraulic pressure used for actuating a forward clutch or a reverse brake which is used for switching the direction of the drive of the vehicle can be increased, the hydraulic pressure used for maintaining the starting clutch engaged after the engagement of the clutch can be increased, or the pressure of the oil discharged from the oil pump can be increased. Taking one of such measures promotes a temperature increase of the oil. For example, if the lateral thrust is increased, then the friction generated between the grooves of the pulleys and the metal V-belt increases correspondingly. As a result, more frictional heat is generated, contributing to the increase of the temperature of the oil. Also, if the discharge pressure of the pump is increased, then the heat generated by the pump is increased, so the temperature increase is also promoted. In this way, the oil temperature is raised quickly to shorten the time during which the above mentioned unfavorable phenomena may take place.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 6 is a table showing some values for an additional torque set in the thrust control.

DESCRIPTION OF THE PREFERRED EMBODIMENTS

Figure 1:
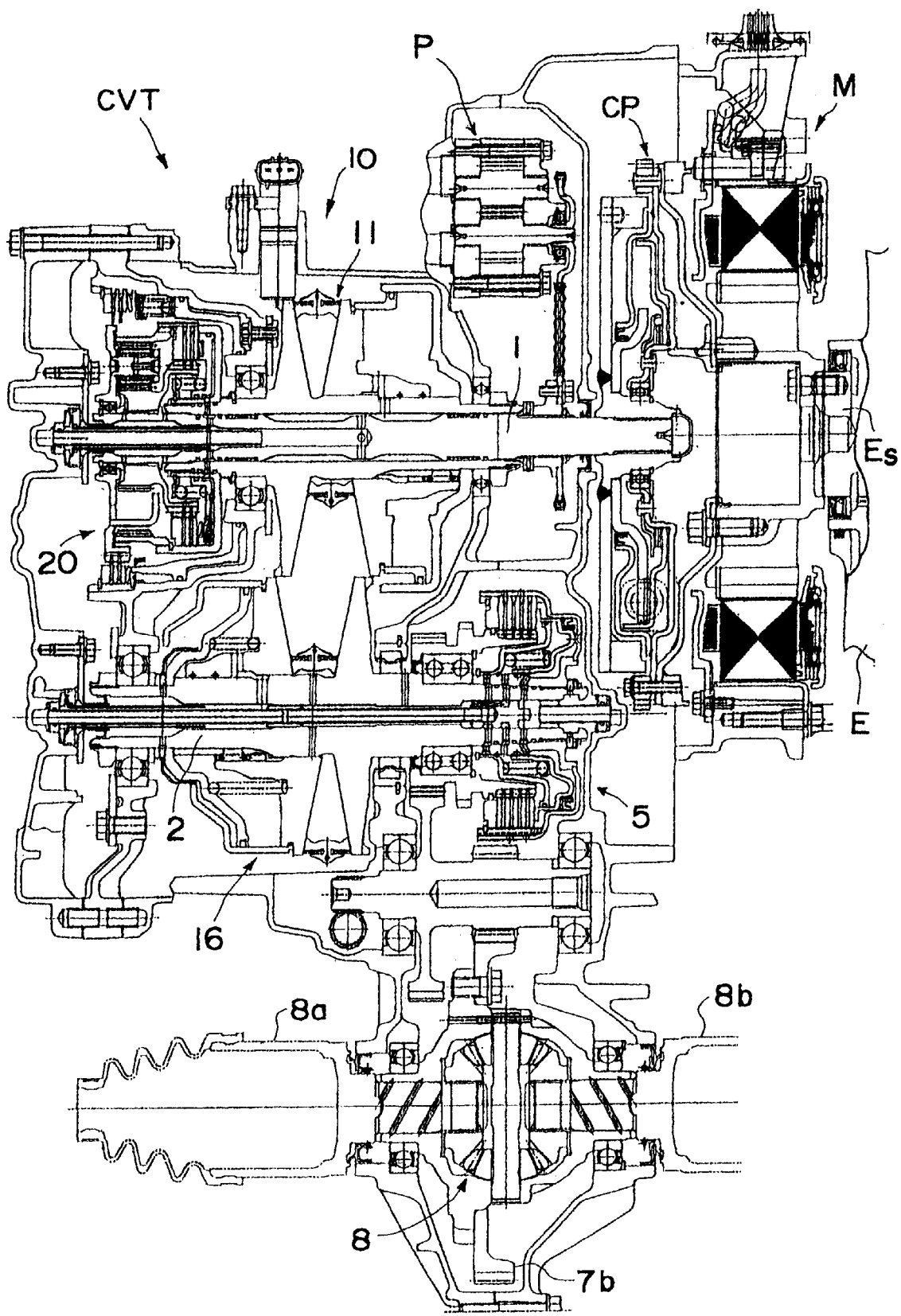
FIG. 1 is a cross-sectional view of a vehicular transmission which incorporates a control system according to the present invention.
Figure 2:
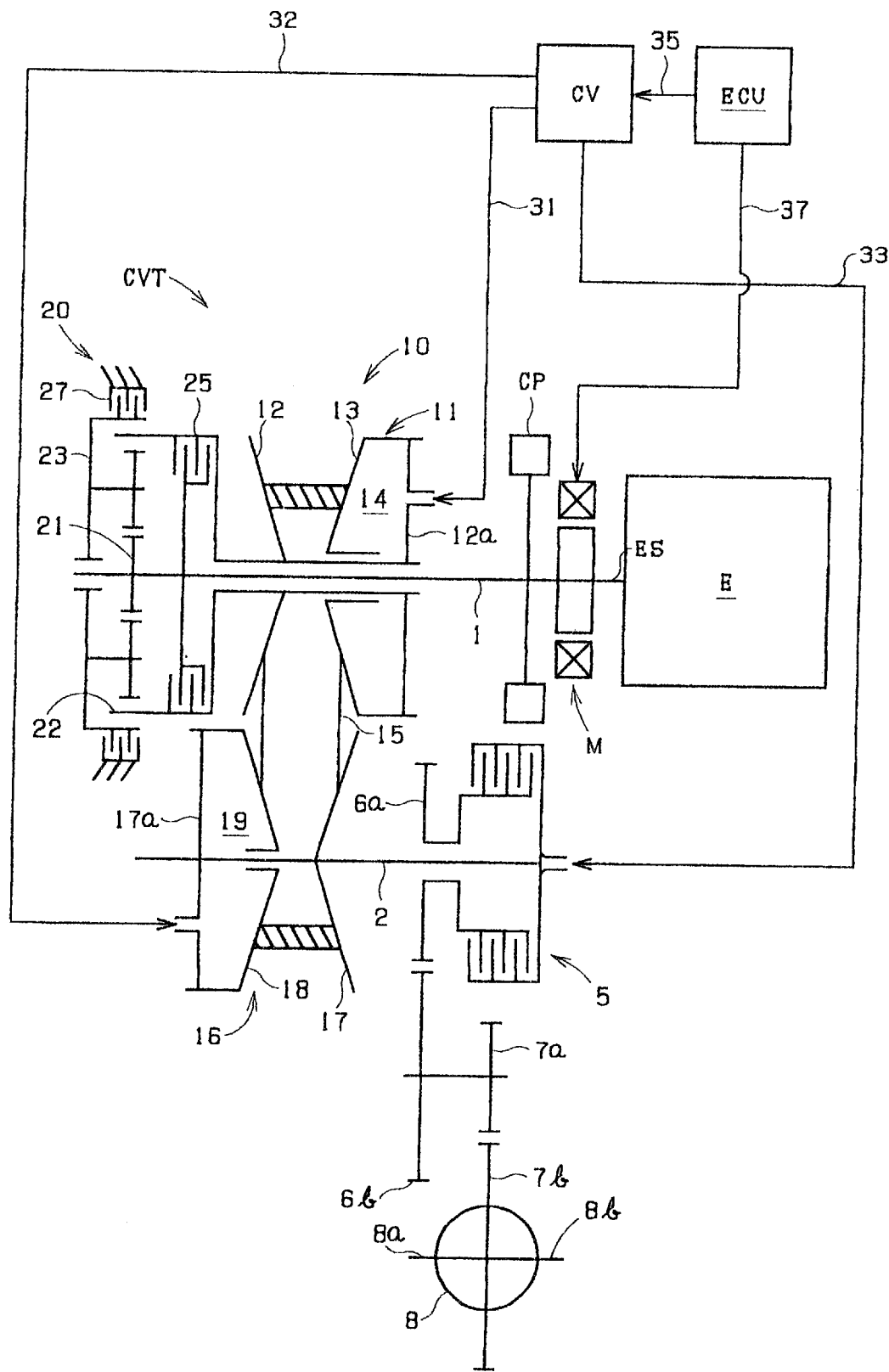
FIG. 2 is a schematic diagram showing the construction of the power transmission mechanism of this transmission.

FIG. 1 is a cross-sectional view of a vehicular transmission which incorporates a control system according to the present invention. FIG. 2 shows the construction of the power transmission mechanism of this vehicular transmission, which comprises an engine E, an electrical motor M, and a continuously variable transmission CVT. The electrical motor M is disposed over the output shaft Es of the engine while the continuously variable transmission CVT is connected through a coupling mechanism CP to the engine output shaft Es. The engine. E is a fuel injection engine, so the injection of fuel into the engine is terminated when the vehicle decelerates as described in detail later in this section. The electrical motor M is powered by a battery which is mounted on the vehicle, and the electrical motor assists the driving force of the engine. In this way, the vehicular transmission is constructed as a hybrid transmission with these two power sources.

The continuously variable transmission CVT comprises a metal V-belt mechanism 10, a forward/reverse switching mechanism 20 and a starting clutch (or main clutch) 5. The metal V-belt mechanism 10 is disposed around the input shaft 1 and the countershaft 2 of the transmission, the forward/reverse switching mechanism 20 is disposed over the input shaft 1, and the starting clutch 5 is disposed on the countershaft 2. This continuously variable transmission CVT is mounted on a vehicle, and the input shaft 1 is connected through a coupling mechanism CP with the output shaft Es of the engine. The driving force output from the transmission is transmitted through the starting clutch 5 to the differential mechanism 8 and then used for driving axle shafts 8a and 8b to rotate the right and left wheels of the vehicle (not shown). The continuously variable transmission CVT is provided with a hydraulic pump P, which is driven through a chain that is disposed around a sprocket mounted on the input shaft 1 to generate the hydraulic pressure necessary for supplying lubrication oil and for controlling hydraulic actuators.

The metal V-belt mechanism 10 comprises a variable width drive pulley 11, which is disposed over the input shaft 1, a variable width driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which is movable with respect to the stationary pulley half 12 in the axial direction of the pulley 11. On the outside of the movable pulley half 13, a drive-pulley cylinder chamber 14 is defined by a cylinder wall 12a which is fixed to the stationary pulley half 12. The pressure supplied through a control valve CV and through an oil passage 31 into the cylinder chamber 14 (this pressure is referred to as "drive pulley pressure") generates a thrust which shifts the movable pulley half 13 in the axial direction of the drive pulley.

The driven pulley 16 comprises a stationary pulley half 17, which is fixed on the countershaft 2, and a movable pulley half 18, which is movable with respect to the stationary pulley half 17 in the axial direction of the pulley. On the outside of the movable pulley half 18, a driven-pulley cylinder chamber 19 is defined by a cylinder wall 17a which is fixed to the stationary pulley half 17. The pressure supplied through the control valve CV and through an oil passage 32 into the cylinder chamber 19 (this pressure is referred to as "driven pulley pressure") generates a thrust which shifts the movable pulley half 18 in the axial direction of the driven pulley.

In this construction, the control system controls the hydraulic pressures which are supplied into these cylinder chambers 14 and 19 of the drive and driven pulleys, respectively, by the control valve CV to generate appropriate lateral thrusts in these two pulleys for changing the speed change ratio of the transmission. Specifically, the system, while preventing any slip of the belt 15, adjusts the difference between the pressures supplied to the drive and driven pulleys, so that the lateral thrusts generated in the respective pulleys change the widths of the V grooves of the drive and driven pulleys 11 and 16. Thereby, the pitch radii of the respective pulleys for the V belt 15 are changed to vary the speed change ratio of the transmission continuously.

Furthermore, the forward/reverse switching mechanism 20 is a planetary gear train, which comprises a sun gear 21, a ring gear 22, a carrier 23 and a forward clutch 25. The sun gear 21 is connected to the input shaft 1, and the ring gear 22 is connected to the stationary pulley half 12 of the drive pulley 11. The carrier 23 can be held against rotation by a reverse brake 27, and the forward clutch 25 can be operated to connect the sun gear 21 with the ring gear 22. In this mechanism 20, when this forward clutch 25 is engaged, all the gears 21, 22 and 23 rotate together with the input shaft 1 as a one body, and the drive pulley 11 is driven by the driving force of the engine E in the same direction as the input shaft 1 (i.e., in the forward direction of the vehicle). On the other hand, when the reverse brake 27 is engaged, the carrier 23 is held stationary, so the ring gear 22 rotates in the direction opposite to that of the sun gear 21, and the drive pulley 11 is driven by the driving force of the engine E in the direction opposite to that of the input shaft 1 (i.e., in the reverse direction).

The starting clutch 5 is a clutch to control the power transmission between the countershaft 2 and the output members of the transmission, i.e., gears 6a, 6b, 7a and 7b. When the starting clutch 5 is engaged, the power is transmitted there between. In the condition where the starting clutch 5 is engaged, the output of the engine, after undergoing the speed change by the metal V-belt mechanism 10, is transmitted through the gears 6a, 6b, 7a and 7b to the differential mechanism 8 and then divided and transmitted by the differential mechanism 8 to the right and left wheels. When the starting clutch 5 is released, this power transmission is terminated, and the transmission comes into a neutral condition. The engagement of the starting clutch 5 is carried out by a pressure supplied through the control valve CV and through an oil passage 33 (this pressure is referred to as "clutch control pressure").

In the continuously variable transmission CVT, the drive and driven pulley pressures supplied through the control valve CV and through the oil passages 31 and 32, respectively, are used for the speed change control while the clutch control pressure supplied through the control valve CV and through the oil passage 33 is used for the actuation of the starting clutch. The control valve CV itself is controlled by means of control signals sent from an electrical control unit ECU.

In the vehicle incorporating this transmission, the electrical motor M assists the engine E such that the engine E can operate in a range which is most fuel efficient. To improve the fuel efficiency of the vehicle, the operation of the electrical motor M is controlled by means of control signals which are sent from the electrical control unit ECU through a line 37. At the same time, the speed change control is performed to achieve an optimal speed change ratio for operating the engine E in a most fuel efficient manner. This control is also carried out by means of control signals sent from the electrical control unit ECU through a line 35 to the control valve CV.

To further improve the fuel efficiency, the control system according to the present invention additionally performs an idling elimination control. Basically, this idling elimination control is to stop the operation of the engine when the vehicle stops, and when the driving force of the engine becomes unnecessary, i.e, the engine enters into an idling condition. However, to achieve a higher level of fuel efficiency, this system goes further than this basic control. Specifically, the system controls the transmission to terminate the fuel injection if the accelerator pedal is released to decelerate and to stop the vehicle, for preventing the engine from idling.

The idling elimination control is executed when conditions which are confirmed at Step S1 through Step S7 have been satisfied while the vehicle is decelerating. When the vehicle decelerates for a halt with the termination of the fuel injection, which effects an appropriate engine brake, and reaches a low speed range where the vehicle is almost coming into a halt, the engagement of the starting clutch 5 is released gradually to stop the vehicle smoothly and then to stop the operation of the engine at Step S11. Therefore, the control routine shown in FIG. 3 is executed only when the fuel injection is terminated to decelerate the vehicle.

Figure 3:
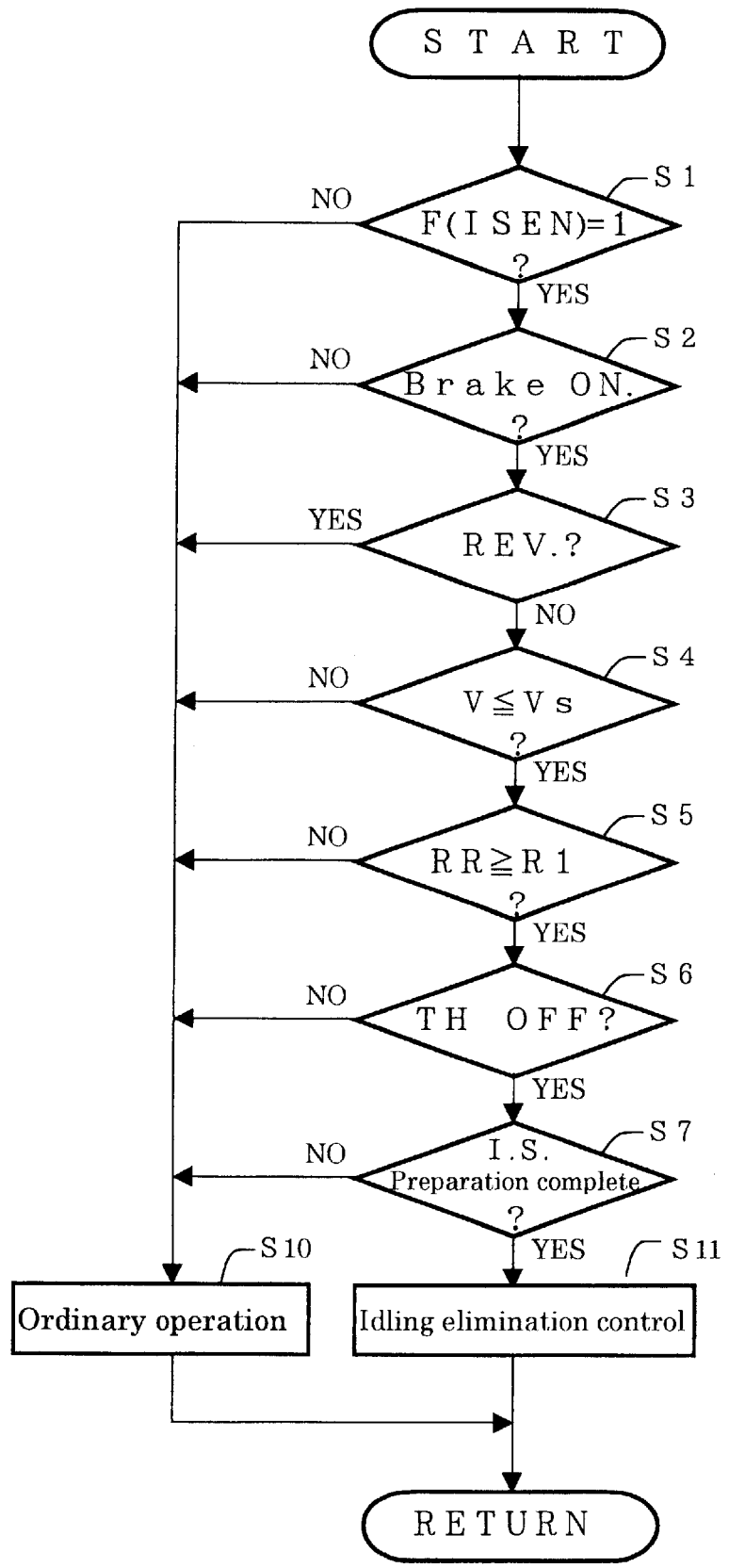
FIG. 3 is a flowchart showing some steps of an idling elimination control according to the present invention, which control is effective when the transmission is operated to decelerate.
Figure 4:
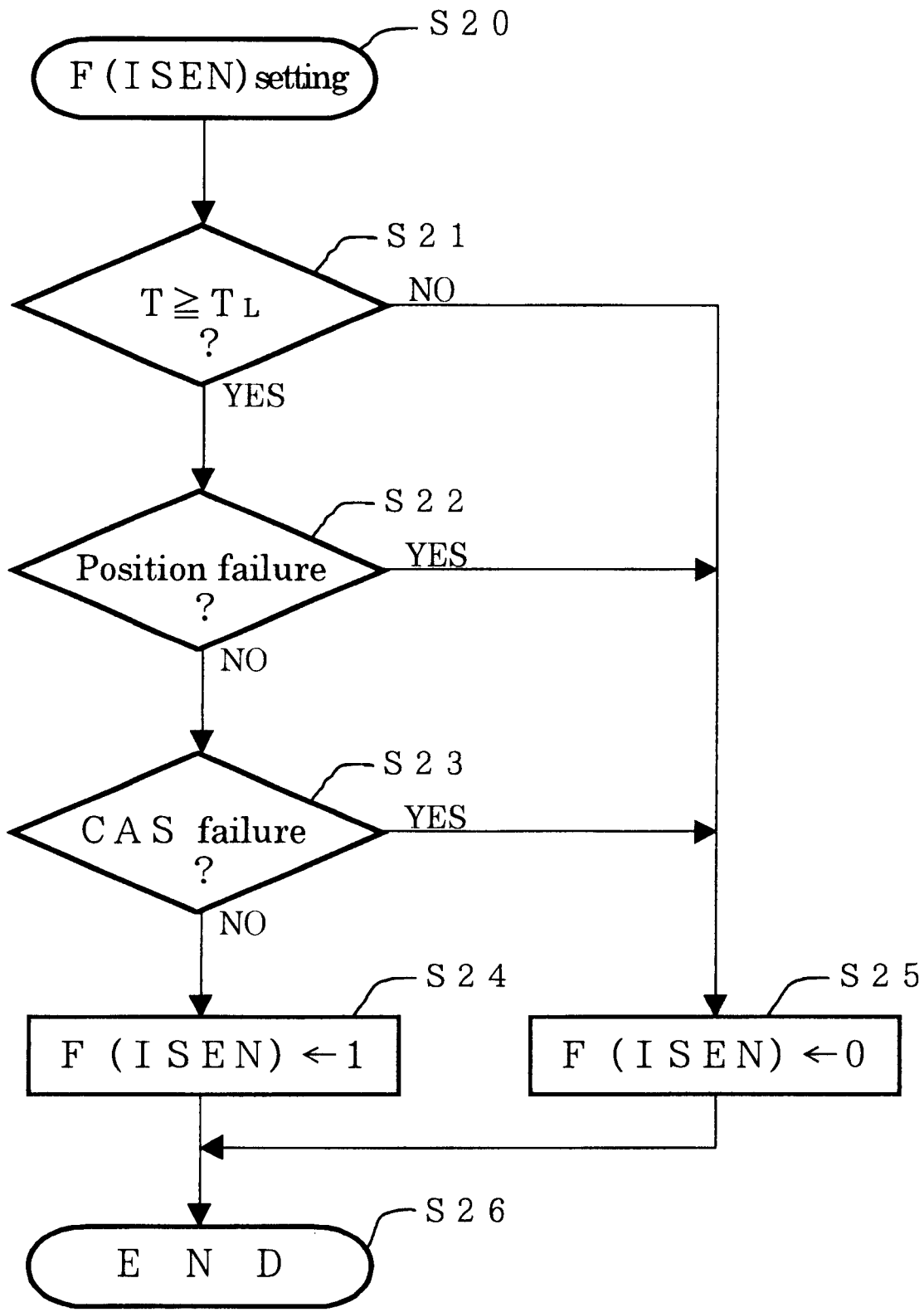
FIG. 4 is a flowchart showing flag set-up steps which confirm preconditions required for executing the idling elimination control.

The control routine shown in FIG. 3 begins at Step S1, where a judgment is made to find out whether preconditions for the idling elimination control are satisfied and a flag indicating the satisfaction is set up, F (ISEN)=1, or not. Referring to the flowchart of FIG. 4, which describes steps involved in setting up the flag F (ISEN) for confirming the satisfaction of the preconditions, at first, a determination is made at Step S21 whether the temperature T of the hydraulic oil used for actuating the starting clutch 5 is equal to or higher than a predetermined temperature $T_L$ (hereinafter referred to as "threshold oil temperature"). This threshold oil temperature $T_L$ is predetermined from the responsivity of the hydraulic oil to the change of the temperature T of the oil used for the actuation of the starting clutch 5 and is set to avoid specifically the above mentioned lag in the actuation of the starting clutch (an starting up lag) and the above described generation of a shock which is caused from an unsuccessful invalid stroke clearing control. The threshold oil temperature $T_L$ can change with respect to the characteristics of the oil (used for lubrication and for actuation), the diameter and length of the tubing of the hydraulic circuit, etc. Here, the inventor of the present invention, after having conducted experiments to determine a limit temperature, sets the threshold oil temperature $T_L$ at about 30 degrees Celsius for this embodiment in consideration of errors in measurement, safety factor, etc.

The temperature T of the hydraulic oil can be detected by any means which is provided to measure the temperature of the oil. However, it is preferable that the temperature be measured at the vicinity of the linear solenoid valve (i.e., the control valve CV shown in FIG. 2) which actuates the starting clutch 5. In this embodiment, the change of the electrical resistance of the solenoid of the linear solenoid valve is measured to determine the temperature T of the oil.

As a result of the determination performed at Step S21, if the temperature T of the oil used is judged equal to or higher than the threshold oil temperature $T_L$, then the control routine proceeds to Step S22. However, if the temperature T is judged lower than the threshold oil temperature $T_L$, then the control routine proceeds to Step S25, where the flag is set down F (ISEN)=0 indicating that the preconditions for the idling elimination control are not satisfied. Then, this control routine ends at Step S26. This is to avoid the above mentioned problem, which may occur if the idling elimination control is initiated while the temperature T is lower than the threshold oil temperature $T_L$.

On the other hand, if the control routine proceeds to Step S22, then another determination is made whether there is an occurrence of position fail in a shift range detection or not.

Here, the term "position fail" means a condition where a value detected by a position sensor which is provided for the detection of the momentary shift range of the transmission is judged as having an error. Examples of such condition include a condition where two or more shift positions, for example, the "D" range and the "Lo" range for the forward drive, are detected simultaneously, and a condition where no shift potion is detected (i.e., the shift range is unknown). If there is no occurrence of position fail, then the control routine proceeds to Step S23. However, if there is a position fail, then it proceeds to Step S25, where the flag is set down F (ISEN)=0, and this flag setting process ends at Step S26.

At Step S23, a determination is made to find out whether there is a failure in the slope regression inhibition system of the transmission. The slope regression inhibition system functions to retain the hydraulic pressure at a level sufficient for the brake to keep the vehicle stationary until the vehicle is operated to restart, while the vehicle is on a slope with the engine being not operated or with a reduced creeping and with the brake pedal being not depressed. In this determination, for example, if an abnormal operation of the solenoid which is provided to keep an appropriated brake pressure is detected, then it is considered as a failure. Also, any abnormal operation of a brake switch detected is considered as a failure. If the slope regression inhibition system is judged having a failure, then the control routine proceeds to Step S25, where the flag is set down, F (ISEN)=0, not to perform the idling elimination control so as to avoid the vehicle going backward on the slope, accidentally. On the other hand, if the slope regression inhibition system is judged not having any failure, then the control routine proceeds to Step S24, where the flag is set up, F (ISEN)=1, and this flag setting process ends at Step S26.

As described above, if any of the preconditions is dissatisfied, and the flag is set down, F (ISEN)=0, then the control routine proceeds to Step S10 shown in FIG. 3, where the engine is operated in a normal manner. In other words, when the conditions for the termination of the fuel injection are not satisfied, the system controls to resume the fuel injection. As a result, when the vehicle is brought to a halt, the engine is kept idling. On the other hand, if the preconditions are all satisfied, and the flag is set up, F (ISEN)=1, then the control routine proceeds to Step S2, where a determination is made whether the brake of the vehicle is on or off, i.e., the brake pedal is depressed or not. If the brake is off, then the control routine proceeds to Step S10 to perform the ordinary drive control. On the other hand, if the brake is on, then the control proceeds to Step S3, where a determination is made whether the transmission is in the reverse drive range or not. The idling elimination control is executed only while the transmission is in the forward drive range. Therefore, if the determination indicates that the transmission is in the reverse drive range, then the control routine proceeds to Step S10 to perform the ordinary drive control. On the other hand, if the transmission is not in the reverse drive range, then the control routine proceeds to Step S4, where a determination is made whether the speed V of the vehicle is equal to or lower than a predetermined speed Vs (e.g., 15 km/h) or not. The idling elimination control is a control which is executed when the vehicle is being stopped. Therefore, if the vehicle is not driving at a low speed, the control routine proceeds to Step S10 to perform the ordinary drive control.

When the speed of the vehicle decreases below the predetermined speed, the control routine proceeds to Step S5, where a determination is made whether the reduction ratio RR of the transmission is equal to or greater than a predetermined reduction ratio R1 (LOW ratio) or not. The idling elimination control is executed to stop the engine, so if the engine is stopped, then the speed change ratio cannot be changed thereafter. Therefore, it is necessary that the speed change ratio be adjusted to a LOW ratio before the start of the idling elimination control, so that the vehicle can be started smoothly after the restart of the engine. Thus, the predetermined reduction ratio R1 is a ratio (=2.2) near the LOW ratio (=2.4), and the determination at Step S5 is to determine whether the reduction ratio of the transmission has become a ratio near the LOW ratio or not. Until such a ratio is achieved, the control routine proceeds to Step S10 to perform the ordinary drive control. When such a ratio is achieved, the control routine proceeds to Step S6, where a determination is made whether the throttle of the engine is closed completely or not. If the throttle is open, i.e., the accelerator pedal is depressed by the driver, then the control routine proceeds to Step S10 to perform the ordinary drive control, and the idling elimination control is not executed because the driver is judged having no intention to stop the vehicle.

If the throttle is judged to have been shut completely, then the control routine proceeds to Step S7 to perform further determinations to find out whether the vehicle is ready for the idling elimination control or not. Here, for example, if the air conditioner of the vehicle is on or not, if there is enough charge in the battery or not, and if the negative pressure used to assist the operation of the brake is at an appropriate level or not are determined. If the air conditioner is on, if the battery do not have enough charge, or if the negative pressure for assisting the brake is short, then the control routine proceeds to Step S10 to perform the ordinary drive control. On the other hand, if these preparations are judged complete, then the control routine proceeds to Step S11, where the control transits to the idling elimination control.

As described above, the preconditions for executing the idling elimination control are that the temperature of the hydraulic oil actuating the starting clutch 5 is not lower than the predetermined temperature, that there is no position failure, and that the slope regression inhibition system is not experiencing a failure. After these preconditions are satisfied, if the vehicle is ready for the idling elimination control, i.e., the brake of the vehicle is on, the transmission is not in the reverse drive range, the vehicle is driving at a speed lower than the predetermined speed, the reduction ratio is almost at the LOW ratio, and the throttle is closed substantially, then the idling elimination control is executed.

Figure 5:
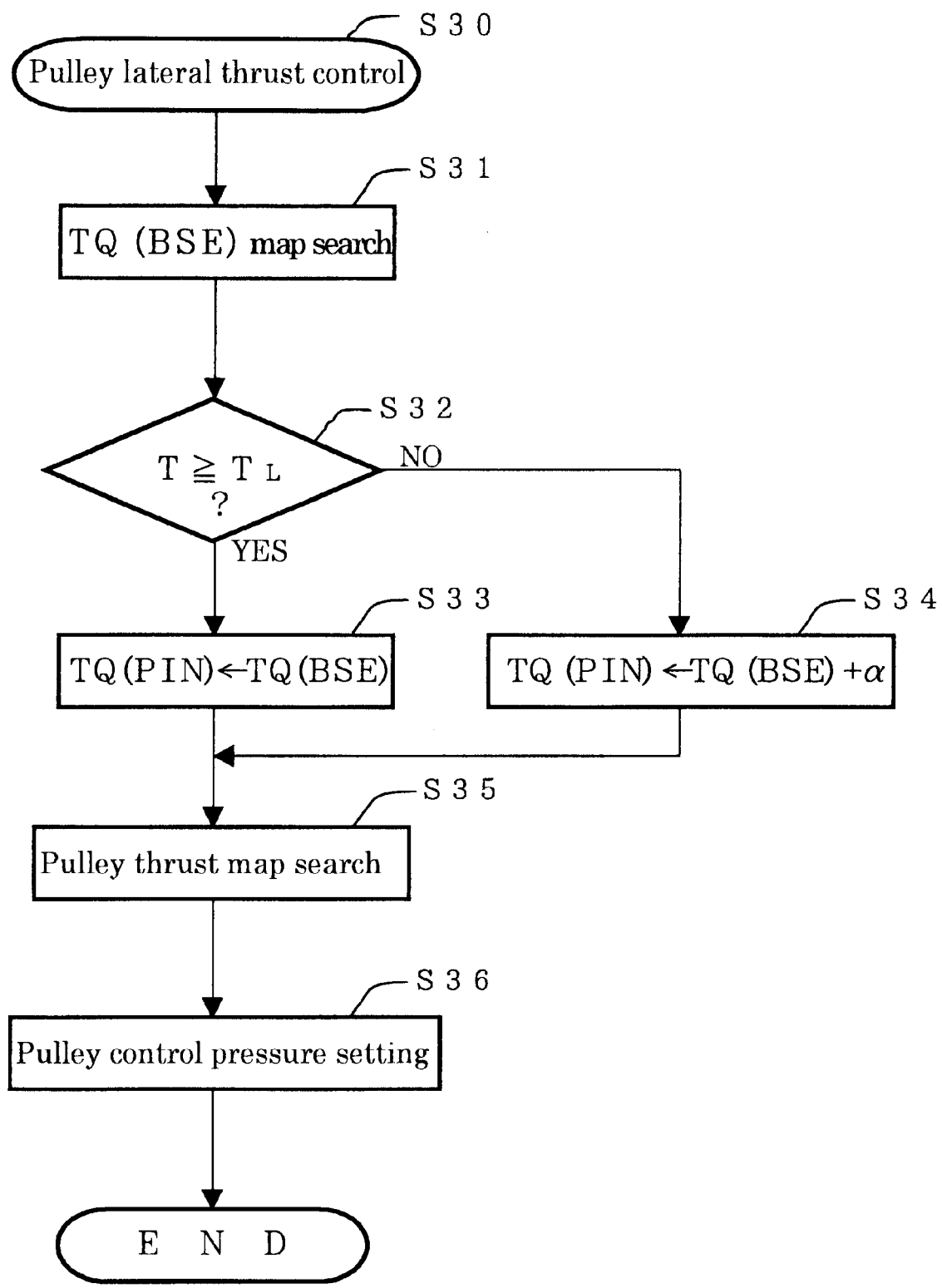
FIG. 5 is a flowchart showing steps which control the thrust that acts on pulleys for varying the speed change ratio of the transmission.

The control system of the present invention does not execute the idling elimination control if ant of the conditions for the idling elimination control is dissatisfied. In addition to this preventive measure, the system performs an operation which raises the temperature of the hydraulic oil if the temperature of the oil is determined not warm enough for the reliable operation of the transmission. As such a temperature raising operation, FIG. 5 shows a control routine S30 which is executed to raise a pulley lateral thrust. Now, this pulley lateral thrust control S30 is described in detail. At first, the engine rotational speed Ne and the suction negative pressure Pb of the engine are used as keys to retrieve an assessed value of engine torque TQ(BS) from a map in memory at Step S31.

At Step S32, a determination is made to find out whether the temperature T of the hydraulic oil actuating the starting clutch 5 is equal to or higher than the above mentioned threshold oil temperature $T_L$ or not, i.e., whether the temperature of the oil is relatively low or not. If the temperature of the oil is judged equal to or higher than the threshold oil temperature T$_L$, then the control routine proceeds to Step S33, where a pulley input torque is set in an ordinary way, i.e., the assessed value of engine torque TQ(BSE) retrieved at Step S31 is set as the pulley input torque TQ(PIN). However, if the temperature T is judged lower than the threshold oil temperature T$_L$ at Step S32 (low oil temperature condition), then the control routine proceeds to Step S34, where the pulley input torque is set for this low oil temperature condition. Here, the engine torque TQ(BSE) retrieved at Step S31 is added with a predetermined additional torque α to set the pulley input torque TQ (PIN).

At Step S35, the lateral thrust (the thrust for the drive pulley and for the driven pulley) is determined in correspondence to the pulley input torque TQ(PIN) set at Step S33 or Step S34 by retrieval from a map which carries values for the pulley thrust. These values are predetermined in correspondence to the values of the pulley input torque TQ(PIN) which are expected from the rotation of the engine, so that no slippage is allowed between the metal V-belt and the pulleys. Therefore, if the transmission is in a normal oil temperature condition, i.e., not in the above mentioned low oil temperature condition, then the pulley thrust is set to a value which is the minimum necessary for the transmission of the engine torque without slippage of the metal V-belt (refer to Step S33 and Step S35). On the other hand, if the transmission is in the low oil temperature condition, then the pulley thrust is set to a value which includes the predetermined additional thrust in addition to the above minimum (refer to Step S34 and Step S35).

At Step S36, the hydraulic pressures to control the respective pulleys are set in correspondence to the pulley thrust set at Step S35. Here, for the normal oil temperature condition, the control pressure is set to generate the thrust necessary to avoid slippage of the metal V-belt, and for the low oil temperature condition, the control pressure is set to generate the thrust necessary to avoid slippage plus the predetermined additional thrust. For the actual generation of the thrust, the above mentioned electrical control unit ECU outputs a control signal to the control valve CV through the line 35. Upon receiving the electrical current, the control valve CV works to generate the pulley control pressure which is supplied through the oil passages 31 and 32 into the cylinder chambers 14 and 19 of the variable width drive and driven pulleys 11 and 16.

When the temperature of the oil is low, the drive-pulley cylinder chamber 14 and the driven-pulley cylinder chamber 19 are supplied each with the control pressure which is higher than the pressure supplied when the temperature of the oil is at a normal temperature. This higher pressure generates the thrust necessary to avoid slippage plus the predetermined additional thrust for each of the drive and driven pulleys. As a result, the frictions generated between the variable width drive and driven pulleys 11 and 16 and the metal V-belt 10, which is disposed and rotated around the pulleys frictionally engaging and disengaging, are increased to produce more frictional heat. This condition results in an increased temperature of the lubrication oil used for cooling the metal V-belt and the pulleys, and this increased temperature of the lubrication oil leads to an quick increase of the temperature of the oil used for actuating the speed change mechanism including the starting clutch. In this way, the temperature of the oil is raised to a normal operational temperature quickly. Thus, the time during which the temperature of the oil is lower can be effectively shortened, alleviating the above mentioned problems of starting up lag and starting up shock, which may occur while the oil temperature is relatively low.

If the pulley thrust is increased unreasonably, then this condition affects the fuel efficiency of the vehicle and the durability of the metal V-belt. To avoid such adverse effects, the system according the present invention sets a limit or a certain range for the predetermined additional torque α, which is set at Step S34. The smaller the engine torque TQ(BAS), which is the base of the determination of the pulley input torque TQ(PIN), the larger the value for the predetermined additional torque is set (for example, 15 kg/cm$^2$). The larger the engine torque TQ(BAS) is, the smaller the value is set (for example, zero). These values are organized in a map format. FIG. 6 shows some examples of values which are set as the predetermined additional torque α in a map format. FIG. 6(a) is an example where a constant additional torque α 1 is applied for a range of magnitude of the engine torque upto a predetermined engine torque. FIG. 6(b) is an example where the value of the additional torque α is reduced accordingly for the increased amount of the engine torque TQ(BAS), (this example can be applied for a case where the upper limit of the pulley input torque TQ(PIN) should be controlled).

Figure 7:
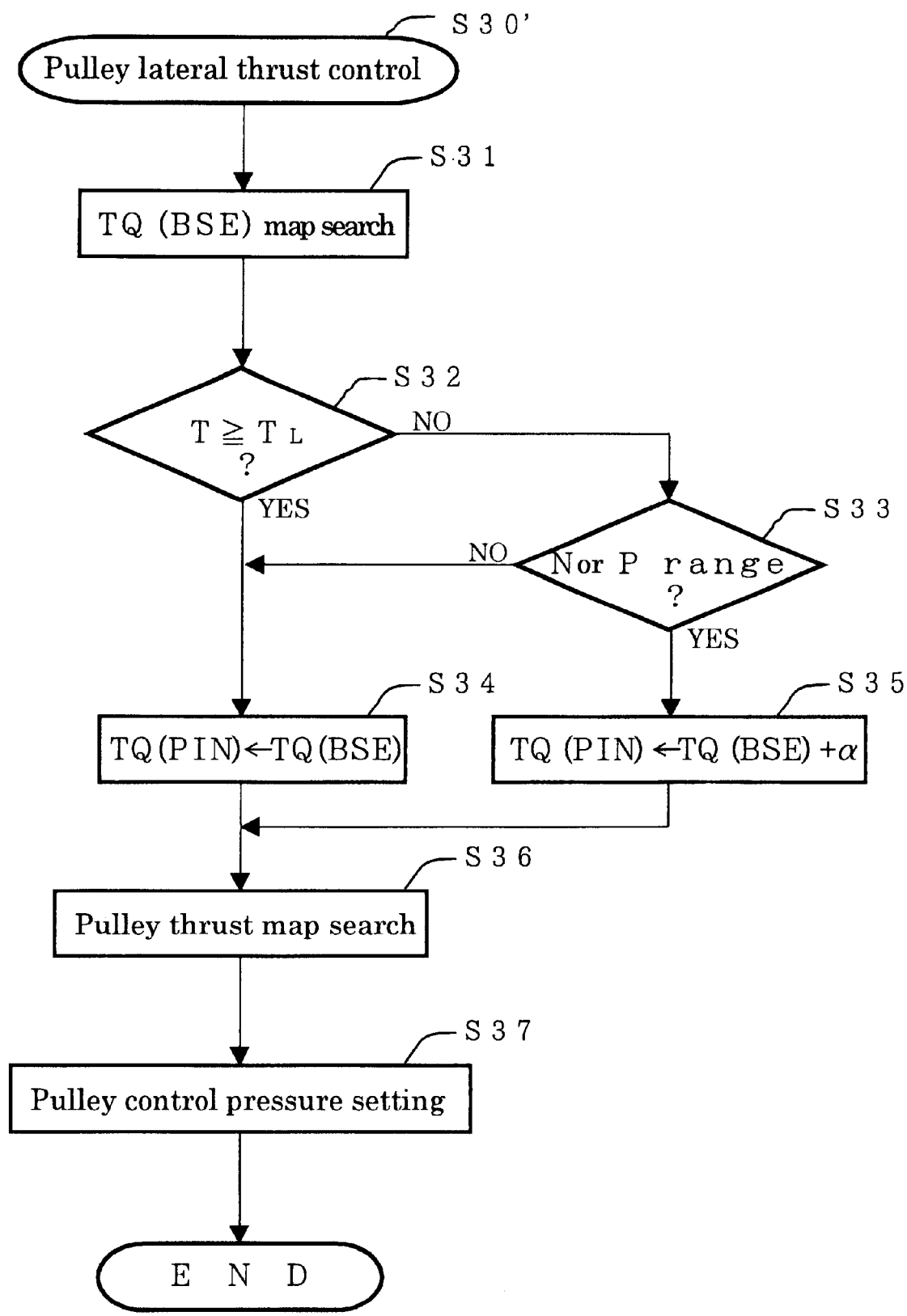
FIG. 7 is a flowchart showing steps of another pulley thrust control.

FIG. 7 shows another embodiment of pulley thrust control which can be executed by the control system according to the present invention. This control routine S30' includes an additional determination of the drive ranges. At Step S32, if the judgment indicates that the transmission is in the above described low oil temperature condition (T<T$_L$), then the control routine proceeds to Step S33, where a determination is made whether or not the transmission is set in a neutral range (N range) or a parking range (P range). If the transmission is judged being in the N range or the P range, then the control routine proceeds to Step S35, where the pulley input torque TQ(PIN) is set by adding the predetermined additional torque α to the engine torque TQ(BSE) retrieved at Step S31. If the transmission is judged being in any range other than the N range or the P range, then the control routine proceeds to Step S34, where the pulley input torque TQ(PIN) is set for an ordinary driving, i.e., the engine torque TQ(BSE) retrieved at Step S31 is set as the pulley input torque TQ(PIN).

In this pulley thrust control S30', the additional torque α is applicable (at Step S35) only if the torque transmitted from the engine is relatively small and the deviation of the torque is also small, which condition can prevail in the N range or the P range. The additional torque is not applied when the transmission is set in any of the other drive ranges (at Step S34). In other words, the additional torque is applied only when the load acting on the metal V-belt is relatively small and the deviation of the load is also small. As a result, no adverse effect may be expected to the belt and to other components used for the pulley thrust control, including the hydraulic circuit of the transmission.

As described above, the system according to the present invention allows the execution of the idling elimination control only when the temperature of the hydraulic oil is equal to or higher than a predetermined temperature. Therefore, the idling elimination control is not performed when the oil temperature is lower than the predetermined temperature. When the oil temperature is low, the system controls the temperature of the oil to rise quickly to a normal operational temperature by increasing the lateral thrust applied to the drive and driven pulleys and thereby increasing the frictional heat generation in the continuously variable speed change mechanism. Thus, the above mentioned problems of starting up lag and starting up shock, which may occur while the oil temperature is low, are prevented, and also, the time during which such phenomena may occur is effectively shortened in this transmission.

The above transmission comprises an engine whose drive force is assisted by the operation of an electrical motor. However, the present invention is not limited to this type of transmission and can be implemented also with a transmission which does not incorporate an electrical motor. Not only the above metal V-belt type continuously variable transmission but also other types of transmission, even a transmission of multiple speed ratios, can be utilized for the implementation of the present invention as long as the speed change mechanism is electrically controlled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 11-203466 filed on Jul. 16, 1999, which is incorporated herein by reference.

What is claimed is:

1. A stop control system for a mechanical power transmission used for driving a vehicle, said power transmission comprising an engine, a speed change mechanism, and a hydraulically actuated frictionally engaging device, said speed change mechanism conveying a driving force from said engine with a speed change, and said hydraulically actuated frictionally engaging device controlling transmission of said driving force from said speed change mechanism;
   wherein:
      said stop control system controls termination of operation of said engine when said vehicle is brought into a halt, by allowing the termination of the operation of said engine only when temperature of hydraulic oil used for generating hydraulic pressure that controls engagement and disengagement of said frictionally engaging device is equal to or higher than a predetermined temperature.

2. The control system as set forth in claim 1, wherein:
said power transmission further comprises an electrical motor, which is connected to an output shaft of said engine, and said electrical motor assists said driving force of said engine.

3. The control system as set forth in claim 1, wherein:
when an accelerator pedal, which has been stepped down, is released to decelerate said vehicle, a control for terminating fuel supply to said engine is executed; and
when said vehicle is brought into a halt, this condition of non-fuel supply is maintained to stop the operation of said engine.

4. The control system as set forth in claim 1, wherein:
when the temperature of the oil used for engaging and disengaging said frictionally engaging device is lower than the predetermined temperature, said system executes a control for raising the temperature of the oil which is used for actuating said power transmission.

5. The control system as set forth in claim 4, wherein:
said speed change mechanism comprises a V-belt type continuously variable speed change mechanism; and
said control for raising the temperature of said oil is performed by increasing a thrust that acts laterally in drive and driven pulleys for varying a speed change ratio of said belt type continuously variable speed change mechanism.

6. The control system as set forth in claim 4, wherein:
said control for raising the temperature of said oil is performed by increasing the pressure of oil which provides an engaging force to said frictionally engaging device.

7. The control system as set forth in claim 4, wherein:
said speed change mechanism incorporates a forward/reverse selector mechanism, which is actuated by a hydraulic pressure; and
said control for raising the temperature of said oil is performed by increasing said hydraulic pressure used for actuating said forward/reverse selector mechanism.

* * * * *